United States Patent [19]
Michel et al.

[11] 3,886,824
[45] June 3, 1975

[54] METHOD AND APPARATUS FOR DEFLASHING HOLLOW PLASTIC ARTICLES

[75] Inventors: Edmond Michel, Brussels; Marcel Duikers, La Hulpe, both of Belgium

[73] Assignee: Solvay & Cie, Brussels, Belgium

[22] Filed: Dec. 27, 1973

[21] Appl. No.: 428,896

[30] Foreign Application Priority Data
Jan. 5, 1973 France............................ 73.00441

[52] U.S. Cl. ..................... 82/47; 82/70.1; 82/101; 82/102
[51] Int. Cl. .......................... B23b 1/00; B23b 5/14
[58] Field of Search ............ 82/46, 47, 48, 70.1, 83, 82/84, 90, 101, 102

[56] References Cited
UNITED STATES PATENTS

| 3,406,598 | 10/1968 | Doucet | 82/46 |
| 3,429,211 | 2/1969 | Pelot | 82/46 |
| 3,653,285 | 4/1972 | Yoshikawa et al. | 82/48 |

*Primary Examiner*—Leonidas Vlachos
*Attorney, Agent, or Firm*—Spencer & Kaye

[57] ABSTRACT

In a procedure in which hollow plastic articles are deflashed, with the removed flash and the deflashed articles moving along respectively different paths subsequent to deflashing, any article which has not been completely deflashed is carried along the path for removed flashes and is thus automatically removed from the flow of properly deflashed articles.

12 Claims, 3 Drawing Figures

METHOD AND APPARATUS FOR DEFLASHING HOLLOW PLASTIC ARTICLES

BACKGROUND OF THE INVENTION

The present invention relates to a process for deflashing the neck of hollow plastic articles, after they have been released from the mold and cooled, as well as to a device which is particularly suitable for carrying out the method.

During the production of hollow articles such as bottles or similar objects by the extrusion blow-molding technique according to which portions of tubular parison made of hot plastic are enclosed in molds and shaped by blowing through a hollow needle which pierces the wall of these portions of parison, there are produced closed hollow articles whose neck is surmounted by a flash, generally called a false neck, which carries the mark left by the blowing needle.

This flash or false neck has to be removed in a subsequent step, after the article has been released from the mold, in order to produce a finished hollow article which is ready for use.

Furthermore, the majority of blowing techniques in which shaping is achieved by inserting a blowing tube into an open end of the parison lead to hollow articles having a neck whose upper part is uneven and has also to be removed by deflashing.

Various processes and devices have already been proposed for deflashing the neck of hollow articles.

Thus, deflashing processes and devices are known in which the hollow articles to be deflashed are grasped at the level of their neck between a fixed guide and a mobile guide which impart to them simultaneously a rectilinear or curvilinear translational movement and a rotational movement about their longitudinal axis against a cutting component consisting of a straight, curved, or circular blade which removes the neck flash. The hollow articles thus treated can be conveyed either to a store or directly to their use position.

In these processes and devices, the guides can act either at the level of a groove provided on the neck of the hollow article, or at the level of a groove provided on the neck flash.

The deflashing devices based on this operational principle are generally effective, but it can happen nevertheless that, accidentally, certain hollow articles pass through them without being rotated and consequently without being deflashed. In these cases, the defective hollow articles are freed in the same way, and are removed at the same time, as the hollow articles which have been correctly deflashed. In order to avoid any disturbance in the rest of the production line, it is advisable that they be subsequently removed by the intervention of an operator who permanently supervises the functioning of the machine.

SUMMARY OF THE INVENTION

It is therefore a primary object of the present invention to provide a deflashing process and a device for carrying it out, based on the same general principles, in which the incompletely deflashed hollow articles are removed automatically, thus making it unnecessary to continuously supervise the machine.

According to the process in which the present invention is employed, after the hollow plastic articles have been released from the mold and partially cooled, the necks of the articles are deflashed by gradually cutting off the flash from the neck by means of a cutting component while the hollow articles are made to execute a translational movement such that their longitudinal axis is always perpendicular to the cutting component, and a rotational movement about their longitudinal axis.

The invention involves removing the hollow articles from which the neck flash has not been completely cut off by the same means as the cut-off neck flashes.

According to a particularly advantageous embodiment of the process of the invention, the neck flashes are grasped by a gripping component and are carried, after they have passed through the cutting component, along a different path from that of the deflashed hollow articles. Consequently, the hollow articles from which the neck flash has been imperfectly cut off are carried along the same path as the properly cut-off neck flashes and are removed by the same device as the latter, without any human intervention taking place.

According to this embodiment, the hollow articles to be treated are held by means of a gripping component which acts preferably only on their flash, so that when the deflashing is carried out correctly the corresponding hollow article is released and can continue on its normal path, while when the deflashing is incomplete, the corresponding hollow article is automatically removed from the path followed by the hollow articles which have been correctly treated.

In order to carry out the process of the invention in this way, it is thus important that the component which grips the hollow articles by their flash continue to act beyond the point or region, where the cutting off of the flash is normally complete.

On the other hand, the gripping component can already be actuated before the hollow articles to be deflashed pass into the cutting component.

The hollow articles which have been correctly deflashed are taken up again by a removal device which acts after the cutting-off of the flash is normally complete. Numerous types of devices can be considered for this purpose, such as mobile clips, a tubular pipeline under reduced pressure, a sloping channel and the like.

A particularly simple and effective device includes a continuously moving endless belt disposed at a short distance underneath the bottom of the hollow article. When the removal of its flash has been correctly completed, the article detaches itself from the flash and falls under the influence of gravity onto the endless belt, which carries it along.

The gripping components which can be used within the scope of the invention can be of any suitable type. It is possible to use, in particular, clips, fixed guides which cooperate with mobile guides, mobile guides such as profiled belts or discs with a profiled rim, vents, and the like.

The invention is applicable to hollow articles of any general shape whatsoever, which are equipped with a neck possessing a symmetry of revolution, or axial symmetry. The "longitudinal axis" referred to herein is the axis of the neck.

The invention also involves apparatus which is particularly suitable for carrying out this process.

This apparatus, which forms an integral part of the present invention includes:

1. a component for cutting off the neck flashes,
2. means for causing the hollow articles to execute a translational movement such that their longitudinal axis remains perpendicular to the cutting component, 3. means for causing the hollow articles to execute a rotational movement about their longitudinal axis, and
4. gripping components which grasp the neck flashes and carry them away, after they have passed through the cutting component, along a path different from that of the deflashed hollow articles.

According to another preferred embodiment, the components for gripping the neck flashes of the hollow articles to be deflashed consist of combinations of at least two wheels mounted on fixed arms firmly attached to a rotating support and at least one wheel mounted on a mobile arm firmly attached to the same rotating support, as well as of a system for moving each mobile arm in such a way that its wheel imprisons the flash between the various wheels of the combination.

The path of the translational movement imparted by the rotation of the rotating support is chosen in such a way that the hollow articles to be deflashed are presented to the cutting component in the correct way. This path is generally circular. The hollow articles are brought within reach of the device by means of an independent conveying device such as, for example, an endless belt.

The device releases the flash by a movement of each mobile arm in the reverse direction after removing the corresponding deflashed hollow article towards an independent processing path.

The various wheels equipping each combination are preferably situated in one and the same plane, which is perpendicular to the longitudinal axis of the hollow articles to be deflashed, and their rims are profiled according to the profile of the neck flash to be removed. Thus, for example, it is useful, during molding to provide for the formation on the neck flashes of the hollow articles of a groove which will subsequently be treated on the deflashing device and to give the wheels equipping the device a profile corresponding to this groove in order to make it possible to position the hollow articles better in the deflashing device.

In general, each combination is equipped with two wheels mounted on fixed arms and with one wheel mounted on a mobile arm, these three wheels being positioned in such a way that, when the flash of a hollow article is grasped, their respective axes are situated at the apex of a substantially equilateral triangle, the center of which generally coincides with the longitudinal axis of the hollow article. The hollow article to be deflashed is thus always held by at least three points on the periphery of its flash, which makes it possible to ensure perfect positioning of the hollow article when the neck flash is being cut off.

Any system whatsoever can be used for controlling the mobile arms of each combination mounted on the rotating support, causing them to move in one direction when the hollow articles to be deflashed are grasped by their flash, and in the other direction when the flash which has been cut off is released. Thus, for example, the use of pneumatic controls actuated by a programmer can be envisaged. However, according to a preferential embodiment, this system consists of a cam control which acts on the end of each mobile arm opposite to that carrying the wheel. This cam is preferably fixed and is profiled in such a way as to cause the movement of the mobile wheel of a combination towards the fixed wheels at the instant when the flash of a hollow article presented by the conveyor device is inserted between the various wheels of this combination, and to cause a second movement of this wheel, in the opposite direction, in order to free the cut-off flash at a point situated beyond that where the cutting-off is normally completed, and thus at a point situated after the position where the hollow articles which have been correctly deflashed can be removed towards an independent circuit, or path.

As a result of the fact that, as has been stated, the hollow articles to be deflashed are gripped by the wheels of the combinations mounted on the mobile support only at the level of their flash, a hollow article which may have been incompletely deflashed is not released in the direction of the path for the removal of the deflashed hollow articles but, on the contrary, is held by its flash until it reaches the position where the latter is freed. In this way, the defective hollow articles are thus removed automatically from the flow of properly deflashed articles and are carried away with the flashes. This removal can be effected by means of any device whatsoever, such as gravity, suction, a conveyor belt and the like.

The translational movement of the hollow articles at the time of the cutting-off of the flash is brought about by the rotating support, which is driven by a suitable motor. The rotational speed of this support is preferably adjusted according to the rate of movement of the conveyor device supplying the hollow articles to be deflashed in such a way that each successive hollow article is grasped by a successive combination equipping this support.

The rotational movement of each hollow article about its longitudinal axis at the time of the cutting-off of the flash is brought about by the wheels equipping the combinations mounted on the rotating support. For this purpose, at least one wheel of each combination is made to execute a continuous rotational movement about its axis. This drive can be provided either by the motor actuating the rotating support, via a suitable transmission, or by an independent motor.

The component for gradually cutting off the flash can advantageously include, as the tool which does the cutting, a blade which can be fixed or mobile, and straight or curvilinear, and which is mounted on the frame of the device so as to effect the desired cutting operation during the translation and rotation of the hollow articles.

According to another embodiment, the cutting component can consist of circular blades, each of which is integral with one of the wheels of each combination which is made to execute a continuous rotational movement about its axis. In this case, each blade is fixed under the corresponding wheel in a position which ensures the desired cutting-off.

Moreover, the devices according to the invention will be described in greater detail in the description, which now follows, of a different practical embodiment of a deflashing device according to the invention. It is to be understood, however, that this description is given purely by way of illustration and that, consequently, it does not in any way limit the scope of the present invention.

DESCRIPTION OF THE PREFERRED EMBODIMENTS

Figure 1:
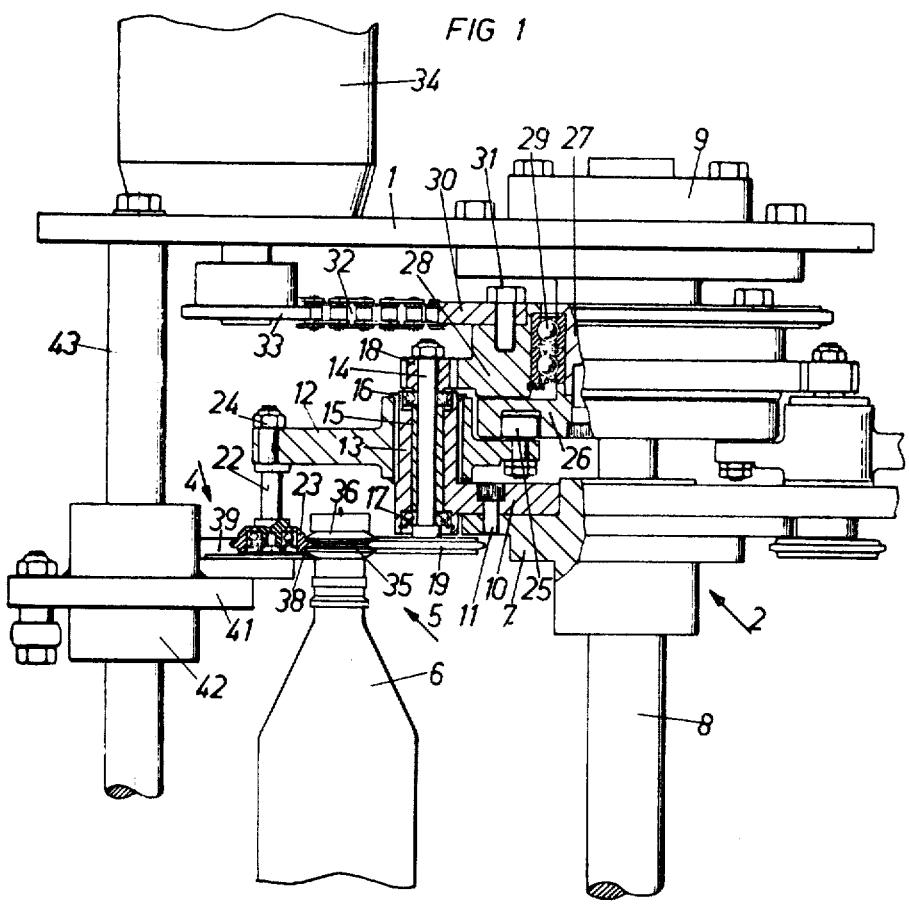
FIG. 1 is a partly cross-sectional, elevational view of a deflashing device according to the invention.
Figure 2:
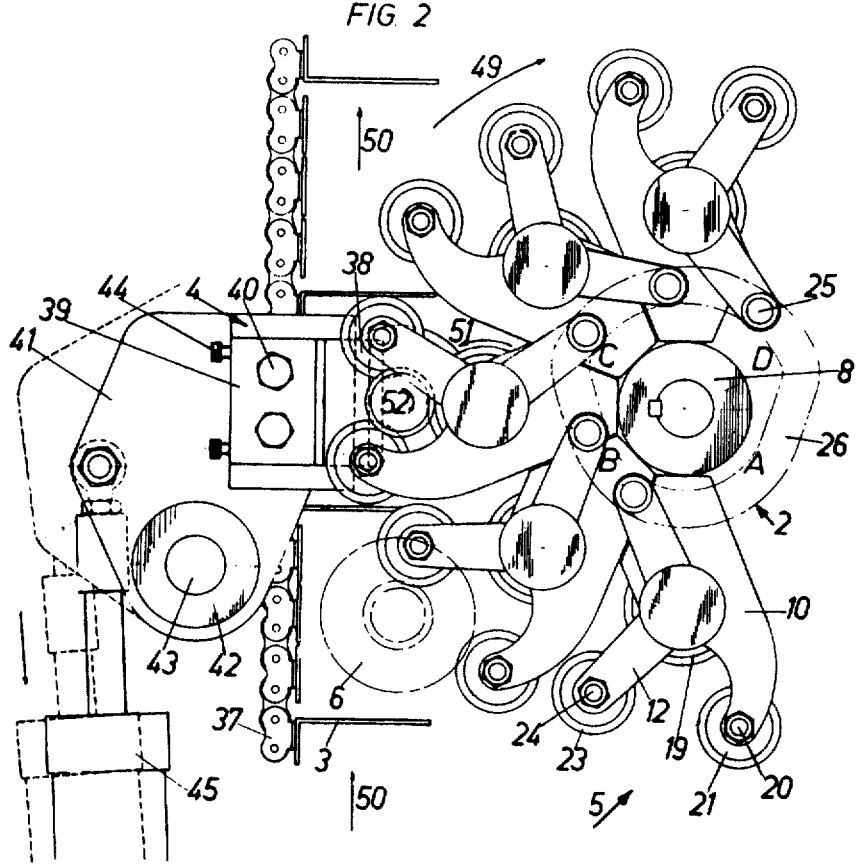
FIG. 2 is a plan view of the device of FIG. 1.

In FIGS. 1 and 2 through concern for clarity, only those elements have been represented which are necessary to enable the device and the way in which it functions to be understood clearly. As is shown therein, the device for deflashing the neck of a hollow plastic article is composed of a fixed frame 1 which has been partially represented, a rotating support 2 mounted on the frame and cooperating with a conveyor device 3 (FIG. 2) supplying the hollow articles to be deflashed and removing the deflashed hollow articles, a component 4 for cutting off the flashes, and combinations 5 mounted on the rotating support 2 to grasp the successive hollow articles 6 supplied by the conveyor device at the level of their flash in order to impart to them a rotational movement about their longitudinal axis and to present them to the cutting component 4 in such a way as to allow the flash to be suitably cut off and the deflashed hollow article to be released onto the conveyor device 3.

The rotating support 2 consists of a circular plate 7 mounted on a shaft 8 which is rotated by a motor (not shown), it being possible for the shaft 8 to turn freely in a bearing 9 firmly attached to the frame 1.

The circular plate 7 is equipped with a series of combinations 5, each of which consists of a fixed arm 10 attached to the circular plate 7 by attachments 11 and supporting, in its turn, an arm 12 hinged about an axle 13 provided on the fixed arm 10. A rod 14, which can turn freely in ball-bearings 16 and 17, spaced apart by a cross-bar 15, passes through the axle 13. At its upper end, the rod 14 carries a gear wheel 18 wedged onto the latter, while at its lower end it is equipped with a wheel 19 integral with it.

As shown in FIG. 2, the end of the fixed arm 10 also carries an axle 20 on which there is mounted an idling wheel 21 which is situated in the same plane as the wheel 19.

A small eccentric rod 22, which also supports an idling wheel 23 situated in the same plane as the wheels 19 and 21, passes through the end of the hinged arm 12. As is apparent more particularly in FIG. 1, the rod 22 is designed in such a way that the relative position of the wheel 23 in relation to the wheels 19 and 21 can be changed slightly by loosening the attachment 24 and by turning the rod 22.

The other end of the hinged arm 12 is equipped with an idling wheel 24 which is inserted in the rolling track of a fixed cam 26 firmly attached to the frame 1 via the sleeve 27 and the bearing 9.

The profile of the fixed cam 26 is represented in FIG. 2 and is designed in such a way as to cause the hinged arms 12 of the various combinations to move in a way which is compatible with satisfactory operation of the device, as will be explained below.

The gear wheel 18, attached to the rod 14, meshes with a gear wheel 28 which can turn freely about the sleeve 27 via the ball-bearing 29.

A chain wheel 30, firmly attached to the wheel 28 via attachments 31, is connected via a chain 32 to a chain wheel 33 wedged on the shaft of a speed-alteration motor 34 attached to the frame 1. The speed-alteration motor 34 thus makes it possible to rotate the wheel 19 of each combination 5, and to do so at a speed which can be adjusted.

The rim of each of wheels 19, 21 and 23 is profiled in such a way that it can be inserted in a groove 35 provided on the neck flash or false neck 36 of the hollow articles to be deflashed. Furthermore, the frame 1 is equipped with control means which are not represented but which make it possible to bring the rims of the wheels 19, 21 and 23 of each combination 5 to the level of the groove 35 of the hollow articles supplied by the conveyor device 3.

The conveyor device 3, driven by the chain 37, is positioned in such a way as to present the successive hollow articles correctly to the combinations 5 and to remove the hollow articles after deflashing. Its linear speed is synchronized with the rotational speed of the rotating support 2 in such a way that each hollow article to be deflashed, supplied by the conveyor device, is inserted in a respective combination 5.

According to a first embodiment, represented in FIGS. 1 and 2, the component 4 for cutting off the flashes consists of a blade 38 fixed in a support 39 by attachements 40, the support being mounted on a plate 41 firmly attached to a sleeve 42 mounted on a fixed shaft 43 firmly attached to the frame 1. The support 39 of the blade 38 is moreover equipped with adjustment screws 44 which make it possible to control the length of the blade protruding from the support 39.

The plate 41 can pivot about the shaft 43 under the effect, for example, of a pneumatic control 45 in order to enable the blade 38 to be adjusted or replaced easily.

Figure 3:
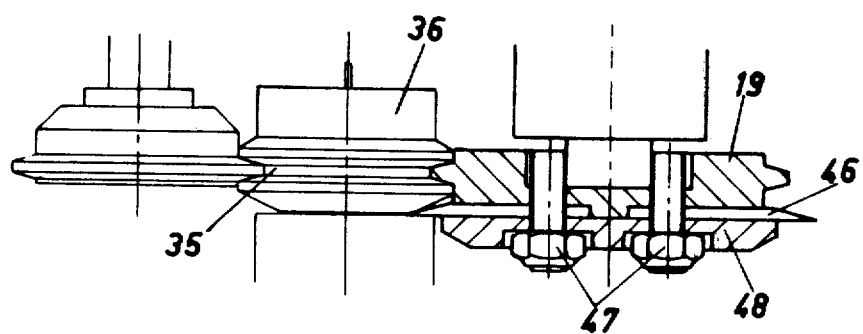
FIG. 3 is an elevational detail view of a different embodiment of the cutting component, which can be used in the device shown in FIGS. 1 and 2.

According to a second embodiment represented in FIG. 3, the component for cutting off the flash consists of circular blades 46 which are fixed under the rotating wheels 19 of each combination 5 equipping the rotating support 2 by means of the attachment 47 and a counter-wheel 48.

The way in which the device which has just been described functions is very simple and depends on the profiles of the cam 26. The outline of this cam is such that, during one complete rotational movement of the rotating support 2, in the direction of the arrow 49, the wheel 23 successively occupies the following positions, shown in FIG. 2, as a function of the position of the wheel 25 in the rolling track of the fixed cam 26.

When the wheel 25 of the combination 5 is between the points A and B of the cam 26, the wheel 23 is at the maximum distance from the wheel 21, which makes it possible for the hollow article 6 to be deflashed, supplied by the conveyor device 3, travelling in the direction of the arrow 50, to take up a position such that the groove 35 of its flash 36 is between the three wheels 19, 21 and 23 of the combination 5.

Thereafter, the wheel 25 slides over the path segment B–C of the cam 26, which causes the hinged arm 12 to pivot and the wheel 23 to come closer to the wheel 21 in such a way that the flash 36 to be removed is grasped gradually by the wheels 19, 21 and 23 at the level of its groove.

At the instant when the wheel 25 reaches the point C of the cam 26, the flash is completely gripped in its groove by the three wheels 19, 21 and 23 of the combination. Consequently, the rotation of the wheel 19 under the effect of the speed-alteration motor 34 and in the direction of the arrow 51 causes the hollow article to be deflashed to rotate in the direction of the arrow 52. At the same time, the flash is pressed against the blade 38 of FIGS. 1 and 2 or the blade 46 of FIG. 3 which causes this flash to be cut off gradually at the desired location. As soon as this cutting-off is complete, the deflashed hollow article is no longer firmly attached to the combination 5 and it can thus be released and removed from the deflashing device by means of the conveyor device 3. On the other hand, the flash 36 which has been cut off remains imprisoned between the wheels 19, 21 and 23 of the combination 5.

While the wheel 25 continues along its path between the points C and D of the fixed cam 26, the wheels 19, 21 and 23 remain in their position and the flash remains imprisoned between them.

When the wheel 25 goes past the point D of the cam 26, the profile of the latter causes the wheel 23 to move gradually away from the wheel 21, and consequently causes the flash 36 to be released under the effect of its own weight.

Finally, when the wheel 25 has reached the point A of the cam 26, the wheel 23 is again at the maximum distance from the wheel 21 and the combination 5 is ready to begin a new cycle.

In the case where, for any reason whatsoever, the operation of cutting off the flash from a hollow article is not complete, this hollow article is automatically moved away from the conveyor device 3 by means of the combination 5 which retains its flash and the hollow article is freed only at the instant when the wheel 25 goes past the point D of the profile of the cam 26, that is to say at the position where the wheels 19, 21 and 23 release the flash.

It is consequently apparent that the deflashing device automatically removes the hollow articles which have been defectively deflashed from the conveyor device 3 and that it thus does not require any supervision.

It should be noted however that the probability of defective deflashing is less in the device described than in the devices used hitherto due to the fact that each hollow article, while it is being deflashed, is held at three points on its flash and that its rotation is consequently more reliable.

It will be understood that the above description of the present invention is susceptible to various modifications, changes and adaptations, and the same are intended to be comprehended within the meaning and range of equivalents of the appended claims.

We claim:

1. In a process for deflashing the neck of hollow plastic articles, after they have been released from the mold in which they were fabricated and partially cooled, which process includes cutting off the neck flash of each such article gradually by a cutting component while causing the hollow article to execute a translational movement while maintaining its axis perpendicular to the cutting component, and a rotational movement about its longitudinal axis, the improvement comprising: removing each cut-off flash from the cutting component by removal means; and removing each article whose flash has not been completely cut-off from the cutting component by the same removal means.

2. A process as defined in claim 1 wherein the removal means including a gripping component for gripping each neck flash and said steps of removing are carried out by conveying cut-off neck flashes and articles which have been completely deflashed away from the cutting component along respectively different paths.

3. A process as defined in claim 2 wherein the gripping component acts directly only on the neck flashes.

4. A process as defined in claim 2 further comprising causing the gripping component to grip each neck flash before it passes through the cutting component.

5. A device for deflashing the neck of hollow plastic articles comprising in combination:
   1. a cutting component for cutting off the neck flash from each such article;
   2. means disposed for causing each such hollow article to execute a translational movement while its longitudinal axis remains perpendicular to said cutting component;
   3. means disposed for causing each hollow article to execute a rotational movement about its longitudinal axis while subject to the action of said cutting component;
   4. means for conveying each completely deflashed article along a path away from said cutting component; and
   5. gripping components disposed for grasping each neck flash and for carrying it away, after passing through said cutting component, along a different path from that followed by the completely deflashed hollow articles.

6. An arrangement as defined in claim 5 further comprising a rotary support and wherein said gripping components are composed of a plurality of combinations, with each said combination including: at least one fixed arm attached to said rotary support; at least one mobile arm attached to said rotary support; at least two wheels mounted on said fixed arm; at least one wheel mounted on said mobile arm; and means for moving said mobile arm relative to said fixed arm for causing a flash to be imprisoned between said wheels.

7. An arrangement as defined in claim 6 wherein said wheels of each said combination are situated in one and the same plane.

8. An arrangement as defined in claim 6 each said wheel of each said combination has a rim which is profiled according to the profile of the neck flash to be removed.

9. An arrangement as defined in claim 6 wherein said at least one wheel is mounted at one end of its said mobile arm and said means for moving said mobile arm comprises a cam control unit arranged to act on the opposite end of said mobile arm.

10. An arrangement as defined in claim 6 wherein said means for causing each article to execute a rotational movement include means for causing at least one of said wheels of each said combination to rotate continuously about its axis.

11. An arrangement as defined in claim 10 wherein said cutting component comprises a circular cutting blade connected to said at least one of said wheels for rotation therewith.

12. An arrangement as defined in claim 5 further comprising a support frame and wherein said cutting component is a fixed blade firmly attached to said frame.

* * * * *